March 29, 1960 — E. H. HARTEL — 2,930,552
TANDEM LANDING GEAR
Filed Dec. 27, 1955 — 2 Sheets-Sheet 1

INVENTOR.
ERWIN H. HARTEL
BY
ATTORNEY

March 29, 1960  E. H. HARTEL  2,930,552
TANDEM LANDING GEAR
Filed Dec. 27, 1955  2 Sheets-Sheet 2
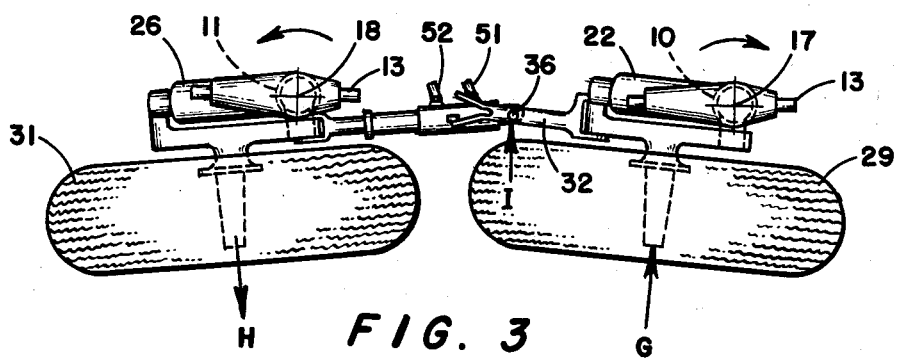
FIG. 3
FIG. 4
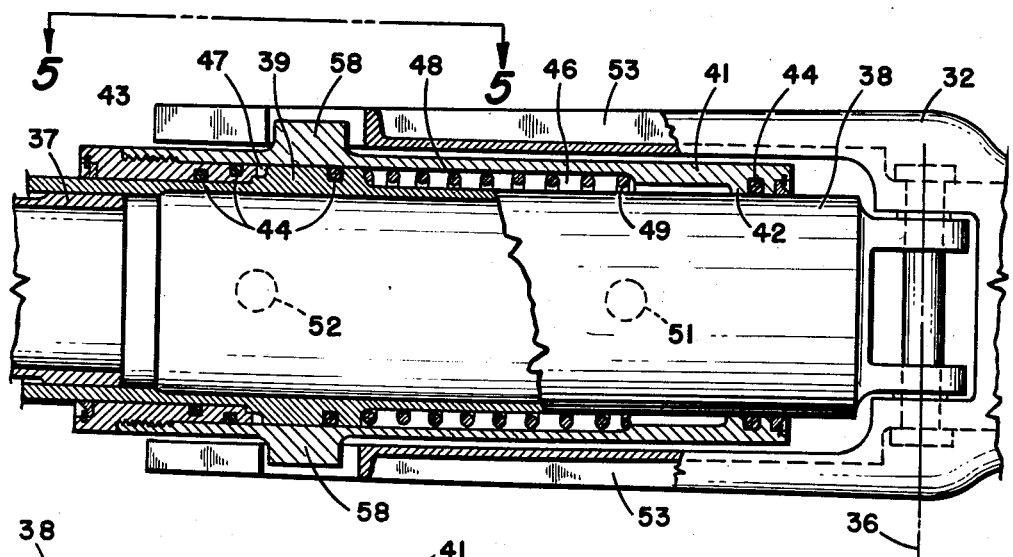
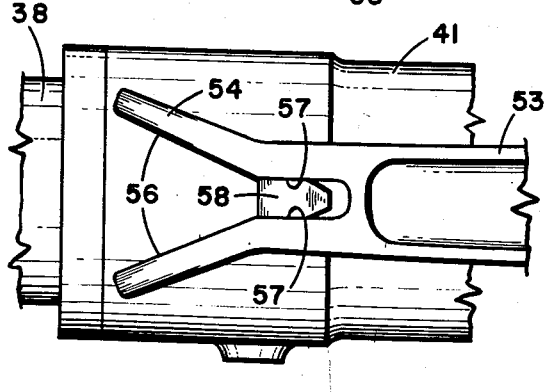
FIG. 5
INVENTOR.
ERWIN H. HARTEL
BY
ATTORNEY

United States Patent Office 2,930,552
Patented Mar. 29, 1960

2,930,552
TANDEM LANDING GEAR

Erwin H. Hartel, Cleveland, Ohio, assignor to Cleveland Pneumatic Industries, Inc., Cleveland, Ohio, a corporation of Ohio Application December 27, 1955, Serial No. 555,337

9 Claims. (Cl. 244—103)

This invention relates generally to landing gears and more particularly to a new and improved tandem landing gear wherein undesirable eccentric forces which occur during the operation of the aircraft are automatically balanced.

It is an important object of this invention to provide a tandem landing gear which can be turned during the ground handling of the aircraft without scuffing of the tires.

It is another important object of this invention to provide a tandem landing gear with simple means to eliminate the detrimental effects of eccentric loads on the gear.

It is still another object of this invention to provide a simplified tandem landing gear wherein the wheels may be mounted in an offset manner relative to the struts without creating undesirable twisting moments on the strut.

It is still another object of this invention to provide a tandem landing gear which may swivel to permit turning of the aircraft on the ground without scuffing.

It is still another object of this invention to provide a tandem landing gear which eliminates the need of torque arms and the like.

Further objects and advantages will appear from the following description and drawings, wherein:

Figure 3 is a view similar to Figure 2 showing the position the elements assume when the wheels are swiveled so that the aircraft may be turned;

Figure 4 is an enlarged fragmentary longitudinal section of the locking mechanism utilized to prevent turning of the wheels when unbalanced loads occur; and, Figure 5 is an enlarged fragmentary view taken along 5—5 of Figure 4.

In many large aircraft it is desirable to provide tandem landing gears to support the weight of the aircraft. In some cases it is possible to use dual wheels, however, such a structure increases the lateral width of the landing gear and necessarily increases the lateral width of the storage area into which the landing gear is retracted. When the landing gear is retracted into the wing, it is highly important to maintain the lateral width of the complete landing gear and wheel assembly as small as possible so that the landing gear may be retracted and stored completely within the wing without the necessity of drag producing pods. Also when the landing gear is stored or retracted into the fuselage, it is highly desirable to use tandem gears particularly in cargo aircraft since the landing gear storage area must either project into the interior of the fuselage or be provided in a drag producing pod. In cargo aircraft, it is important that the interior storage within the fuselage be unbroken to facilitate loading and unloading as well as to increase the load capacity and since exterior pods produce additional drag, the tandem landing gear with its small lateral width is often the most efficient structure.

If conventional tandem landing gears are utilized, difficulty is encountered when the aircraft is turned on the ground unless the wheels are permitted to swivel. If a rigid structure is utilized wherein the wheels cannot swivel, a large amount of scuffing occurs which produces unnecessarily large loads on the strut and causes unnecessary wear on the tire. In a landing gear according to this invention the tandem wheels are free to swivel, but means are provided to automatically balance the eccentric loads which occur due to drag and drift during the landing.

Figure 1:
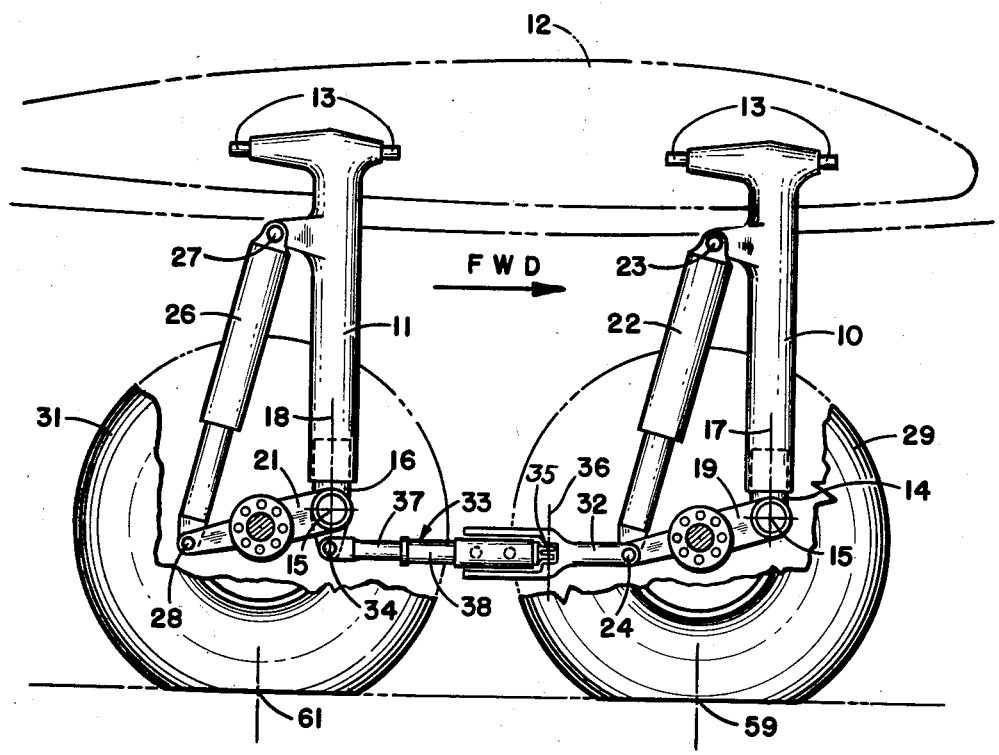
Figure 1 is a side elevation of a preferred landing gear according to this invention.

In Figure 1 a preferred form of this invention is shown wherein the tandem landing gear is provided with a forward strut 10 and an identical rearward strut 11. The two struts are mounted on the wing of the aircraft, shown schematically at 12, by means of mounting trunnions 13. The struts may be retracted into the wing 12 by rotation about the axis of the trunnions 13 and are restrained against any motion relative to the aircraft when the landing gear is in the extended position shown. The lower end of the struts 10 and 11 are hollow and proportioned to receive swivel members 14 and 16 respectively which are vertically fixed relative to the corresponding struts but free to rotate about the swivel axes 17 and 18 respectively. An articulating member 19 is mounted on the swivel member 14 and an articulating member 21 is pivoted on the swivel member 16 both for rotational movement relative to their respective swivel members around pivot axis 15 contained in a plane perpendicular to the swivel axes 17 and 18.

Figure 2:
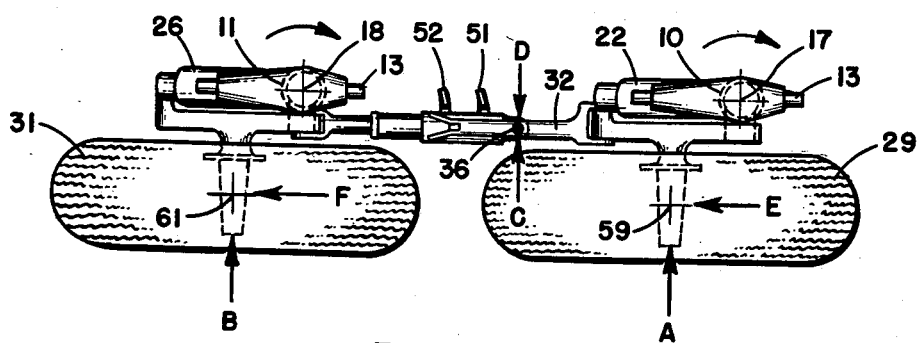
Figure 2 is a plan view of the landing gear shown in Figure 1 when the wheels are locked in the straight ahead or forward position wherein the plane of rotation of each wheel is parallel to the axis of the aircraft.

A spring and shock absorbing assembly 22 is pivotally connected between the strut 10 and the articulated member 19 as at 23 and 24 respectively, and an identical spring and shock absorbing assembly 26 is pivotally connected between the strut 11 and articulated member 21 as at 27 and 28 respectively. Self-aligning bearings should be used for the pivotal connections at 23, 24, 27 and 28 so that the articulating members may pivot around their respective swivel axes 17 and 18 without producing twisting moments on the spring and shock absorbing assemblies 22 and 26. A forward wheel 29 is mounted for rotation on the forward articulating member 19 and a rearward wheel 31 is mounted for rotation on the rearward articulating member 21. Preferably the structure of both the struts and wheel mountings thereon are identical and the various elements are proportioned so that the two wheels are contained in a single plane parallel to the axis of the aircraft when the aircraft is not being turned on the ground. Reference to Figure 2 will show that the centers of rotation of both wheels 29 and 31 are behind and on the same side of their respective struts and contained in a plane parallel to the axis of the aircraft.

A forward link 32 is pivotally connected to the forward articulated member 19 at 24 and a rearward link assembly 33 is pivotally connected to the swivel member 16 as at 34. Both links are connected so that they move with the corresponding articulate member and wheel as they move about their respective swivel axes and can rotate relative to their articulated member around the pivotal connection. Consequently when the two links 32 and 33 are restrained against swiveling motion, the wheels are also restrained. The two links 32 and 33 are pivotally connected together by a pivot 35 for relative rotation around a vertical connection axis 36 which is equally spaced from the swivel axes 17 and 18. The rearward link assembly 33 comprises two telescoping members 37 and 38 so that the rearward link can extend or compress freely as the wheels 29 and 31 swivel. The member 37 is pivoted on the swivel member 34 and the member 38 is connected by the pivot 35 to the link 32 for rotation about the axis 36.

Referring to Figure 4, the telescoping member 38 is provided with a radially extending piston portion 39 which is proportioned to fit into a locking cylinder 41 which is positioned around the telescoping member 38. The locking cylinder is provided with an inwardly extending bearing portion 42 which engages the outer wall of the telescoping member 38 on one side of the piston portion 39 and is provided with a gland member 43 which engages the outer wall of the telescoping member 38 on the other side of the piston portion 39. Resilient fluid seals 44 prevent fluid leakage between the cylinder 41, the telescoping member 38 and the gland member 43 and in cooperation therewith define two fluid chambers 46 and 47 which are positioned on either side of the piston portion 39. A spring 48 extends between the piston portion 39 and a radial wall 49 on the cylinder 41 to the right of the piston portion 39 and resiliently urges the cylinder 41 to the right relative to the telescoping member 38 so that the elements normally assume a locked position shown in Figure 4. Hydraulic connections are provided for the two chambers 46 and 47 through flexible pressure hoses 51 and 52 respectively which connect to a source of pressure fluid (not shown). Therefore when pressure fluid is supplied to the chamber 47 through the pressure hose 52, the cylinder 41 moves to the left relative to the telescoping member 38 to an unlocked position until the spring 48 is fully compressed. Conversely when pressure fluid is supplied to the chamber 46, the force of the spring 48 is augmented to move the cylinder 41 to the right or locked position shown in Figure 4.

The forward link 32 is formed with arms 53 above and below the cylinder 41 with each of the arms formed with a fork portion 54 (see Figure 5) which provide inclined opposed surfaces 56 and parallel opposed surfaces 57. Lugs 58 formed on the outside of the cylinder 41 are positioned between the parallel surfaces 57 when the cylinder 41 is in the right hand or locked position shown in Figures 4 and 5. When the cylinder moves to the left hand position, the lugs 58 are moved to the left relative to the forked portions 54 and are positioned between the inclined surface 56. The various proportions are arranged so that the lugs 58 snugly fit between the parallel surface 57 but provide substantial clearance between the lugs 58 and the inclined surface 56 when the cylinder is in the left hand position. Therefore, the forward link 32 and the rearward link assembly 33 are locked against relative rotation around the pivot axis 36 when the cylinder 41 is in the right hand or locked position of Figures 4 and 5, but when the cylinder 41 moves to the left and the lugs 58 are positioned between the inclined surface 56 and a limited amount of relative rotation is permitted between the forward link 32 and the rearward link assembly 33, the amount of relative rotation being determined by the spacing between the inclined surface in the area of the lugs 58 when the cylinder is in the left hand position.

In operation the cylinder 41 is normally in the right hand or locked position so that the forward link 32 and the rearward link assembly 33 are restrained against pivotal movement around the pivot axis 36. Therefore, the wheels 29 and 31 are mechanically locked in the straight ahead position. During the landing impact if there is any side drift of the aircraft, a large lateral force "A" (see Figure 2) tends to swivel the wheel 28 clockwise around the swivel axis 17. If the load on the two wheels is evenly distributed, an equal force "B" will be applied to the wheel 31 tending to rotate it in a clockwise direction around the swivel axis 18. The result of the turning moment of the force "A" on the wheel 29 is transmitted through the forward link 32 and results in a force "C" at the connection axis 36 which is the same direction as the force "A." The result of the turning moment on the wheel 31 created by the force "B" creates a force "D" at the pivot axis 36 which is in a direction opposite to the force "C." Therefore, the two forces "C" and "D" oppose each other and tend to cancel out. Because the distance of the center 59 of the wheel contact 29 on the ground is spaced from the swivel axis 17, a distance equal to the spacing between the center 61 of the engagement between the wheel 31 and the ground and its swivel axis 18, and since the spacing between the centers 59 and 61 from their respective swivel axes 17 and 18 are in the same direction, the turning moments about the swivel axes 17 and 18 are equal when the forces "A" and "B" are equal. Again, since the pivot axis 36 is equally spaced from the two swivel axes 17 and 18, the forces "C" and "D" will be equal and opposite when the forces "A" and "B" are equal. In actual practice the side load, that is, the forces "A" and "B" on the two wheels will be substantially equal, however, any unbalance caused by unequal loading wheels 29 and 31 when they engage the ground will cause differences in the value of the forces "A" and "B." The differences between these forces are not balanced out but are absorbed by the lock mechanism shown in Figures 4 and 5.

When the wheel brakes are applied, drag forces "E" and "F" are transmitted to the wheels 29 and 31 respectively and create turning moments in a clockwise direction in both swivel members around the respective swivel axes 17 and 18. Here again, if the forces "E" and "F" are equal, the resulting forces at the pivot axis 36 balance and there is no tendency for the wheels to swivel. However, if the forces "E" and "F" are unbalanced, the unbalance is absorbed by the lock mechanism. Those skilled in the art will therefore recognize that no twisting forces are transmitted to the struts 10 and 11.

Once the aircraft is on the ground the pilot must be able to steer for turning and the like. It is therefore necessary to permit swiveling of the two wheels 29 and 31 when the aircraft is turning to eliminate scuffing of the wheels. The pressure hoses 51 and 52 should be connected to the nose wheel steering mechanism of the aircraft in such a manner that when the pilot turns the nose wheel, pressure fluid is supplied to the pressure chamber 47 so that the locking cylinder 41 will move to the left and release the lug so that the forward link 32 and the rearward link assembly 33 may pivot about the pivot axis 36. When the aircraft turns to the right, the trail of the wheels causes a force "G" to be applied to the wheel 29 which tends to swivel the wheel 29 in a clockwise direction around the swivel axis 17 (see Figure 3). At the same time the trail of the wheel 31 automatically causes a force "H" to be applied to the wheel 31 which tends to swivel it around the swivel axis 18 in a counter clockwise direction. The moments of these two forces "G" and "F" results in a single force "I" at the pivot axis 36. Since the moments do not balance each other at this time, the wheels freely swivel until the proper turning radius is achieved. Because the two wheels 29 and 31 are close together, a short turning radius will be provided even though the wheels do not swivel through a large angle. The spacing between the inclined surface 56 on the arms 53 permits a limited amount of swiveling, the particular amount being determined by the necessities of the aircraft design. After the steering is completed and the power steering mechanism is shut off, pressure fluid is supplied to the chamber 46 which assists the spring 48 in moving the lock cylinder 41 back to the right hand or locked position which brings the wheels back into alignment. Of course, when one of the chambers 46 or 47 is supplied with pressure fluid, the other should be exhausted to the reservoir.

Those skilled in the art will recognize that by the use of a structure according to this invention, it is possible to provide a swiveling main landing gear wherein forces tending to swivel the wheels are balanced when swiveling is not necessary so that a relatively lightweight lock mechanism may be utilized. However, when it is desired to steer the airplane, the swiveling forces are unbalanced and proper swiveling is achieved. Because the forces are balanced, it is feasible to use tandem landing gears wherein the wheels are offset to one side of the swivel axis. It should be understood that if the distance between the centers of the tire engagements and the respective swivel axis is equal, the distance between the pivot axis 36 and the respective swivel axis should be equal. However, if a landing gear is used wherein the trail or offset of one wheel is different than the trail or offset of the other wheel, the spacing between the pivot axis 36 and the respective swivel axes 17 and 18 should be arranged so that the eccentric loading on the wheels remain balanced. To do this it is necessary to arrange the proportions so that the product of the horizontal distance between the center 61 and the swivel axis 18 times the distance between the axes 17 and 36 is equal to the product of the distance between the center 59 and the swivel axis 17 times the distance between the axes 18 and 36 providing the direction of the center 59 from the swivel axis 17 is parallel to the direction of the center 61 from the swivel axis 18.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A tandem landing gear comprising strut means adapted to be mounted substantially vertical on an aircraft, a pair of elements mounted at spaced points on said strut means for swinging movement around parallel substantially vertical swivel axes, a ground engaging wheel on each element rotatable in a plane parallel to the associated swivel axis, link means associated with each element restrained against rotation relative thereto around its swivel axis, and pivot means connecting said link means for relative rotation around a connecting axis parallel to said swivel axes.

2. A tandem landing gear comprising strut means adapted to be mounted substantially vertical on an aircraft, a pair of elements mounted at spaced points on said strut means for swinging movement around parallel substantially vertical swivel axes, a ground engaging wheel on each element rotatable in a plane parallel to the associated swivel axis, and releasable lock means operably connected between said elements normally maintaining said wheels parallel and operable to permit swinging movement of said wheels to positions in which they are nonparallel.

3. A tandem landing gear comprising strut means adapted to be mounted substantially vertical on an aircraft, a pair of elements mounted at spaced points on said strut means for swinging movement around parallel substantially vertical swivel axes, a ground engaging wheel on each element rotatable in a plane parallel to the associated swivel axis, and connecting means connected between said elements operable when one of said elements swings through a given angle around its swivel axis to move the other wheel around its swivel axis in the opposite direction through an angle which is a function of said given angle.

4. A tandem landing gear comprising strut means adapted to be mounted substantially vertical on an aircraft, a pair of elements mounted on said strut means at spaced points for swinging movement around parallel substantially vertical swivel axes, a ground engaging wheel on each element rotatable in a plane parallel to the associated swivel axis, the engagement of each wheel with the ground having a center of the wheel engagement spaced from the corresponding swivel axis, pivot means connecting said elements together for relative rotation about a connecting axis, the product of the distance between one of the centers and its corresponding one swivel axis times the spacing between said connecting axis and the other swivel axis being equal to the product of the distance between the other center and the corresponding other swivel axis times the distance between said connecting axis and said one swivel axis.

5. A tandem landing gear comprising two spaced struts contained in a plane substantially parallel to the axis of an aircraft, an element mounted on each strut for pivotal motion around parallel substantially vertical swivel axes, a ground engaging wheel on each element, the engagement of each wheel with the ground having a center of the wheel engagement equally spaced horizontally from their corresponding swivel axis, a link associated with each element fixed against rotation relative thereto in a horizontal plane, and pivot means connecting said links for relative rotation about a connecting axis equally spaced from and parallel to said swivel axes.

6. A landing gear, for aircraft having an axis, comprising strut means adapted to be mounted on the frame of the aircraft, a pair of ground engaging wheels mounted on said strut means with one substantially in front of the other, the mounting of each of said wheels permitting swiveling thereof around a substantially vertical swivel axis spaced from and parallel to the swivel axis of the other wheel, connecting means operatively associated with each of said wheels restrained against rotation relative thereto around the respective swivel axis and pivotally connected together for relative rotation around a connection axis, and releasable locking means operably connected to said connecting means normally preventing relative rotation between said connecting means around said connection axis when both of said wheels are parallel to the axis of said aircraft.

7. A landing gear comprising strut means adapted to be mounted on the frame of an aircraft, a pair of ground engaging wheels mounted on said strut means with one substantially in front of the other, the mounting of each of said wheels permitting swiveling thereof around a swivel axis spaced from and parallel to the swivel axis of the other wheel, a connecting link on each of said wheels mounted for motion therewith around the respective swivel axis pivotally connected together for relative rotation around a connection axis, a fluid actuated member carried by one link adapted to move between a locked and an unlocked position in response to pressure fluid supplied thereto, and stop surfaces on the other of said links engaged by said member when it is in said locked position preventing relative movement between said links around said connection axis.

8. A tandem landing gear comprising two spaced struts adapted to be mounted so that they are contained in a plane parallel to the axis of an aircraft, a swivel member on each strut mounted for rotation relative thereto around a swivel axis spaced from and parallel to the swivel axis of the other swivel member, a lever member on each swivel member rotatable relative thereto around pivot axes contained in a plane perpendicular to the corresponding swivel axis, a ground engaging wheel on each lever member, link means associated with each wheel rotatable therewith around the corresponding swivel axis pivotally and connected together for relative rotation around a connection axis, one of said link means including a pair of telescoping elements which permit a change in length of said one link means, releasable normally locked means operably connected to said link means preventing relative rotation between said link means around said connection axes when said wheels are parallel to the axis of the aircraft, the center of the engagement between each wheel and the ground being spaced from the corresponding swivel axis the same amount and in the same direction as the spacing of the center of engagement of the other wheel with the ground from its swivel axis and said connecting axis being equally spaced from said swivel axes when said wheels are parallel to the axis of the aircraft.

9. A tandem landing gear comprising two spaced struts adapted to be mounted so that they are contained in a plane parallel to the axis of an aircraft, a swivel member on each strut mounted for rotation relative thereto around a swivel axis spaced from and parallel to the swivel axis of the other swivel member, a lever member on each swivel member rotatable relative thereto around pivot axes contained in a plane perpendicular to the corresponding swivel axis, a ground engaging wheel on each lever member adapted to support the weight of the aircraft when it is on the ground, spring and shock absorbing means connected between each strut and its associated lever member to resiliently transmit the load on said wheels to said struts, link means associated with each wheel rotatable therewith around the corresponding swivel axis and pivotally connected together for relative rotation around a connection axis, one of said link means including a pair of telescoping elements which permit a change in length of said one link means, fluid releasable normally locked means preventing relative rotation between said link means around said connection axes when said wheels are parallel to the axis of the aircraft, the center of engagement between each wheel and the ground being spaced behind and to one side of the corresponding swivel axis the same amount and in the same direction as the spacing of the center of the other wheel from its swivel axis and said connecting axis being equally spaced from said swivel axis when said wheels are parallel to the axis of the aircraft.

References Cited in the file of this patent

UNITED STATES PATENTS

| | | |
|---|---|---|
| 2,130,914 | Warren | Sept. 20, 1938 |
| 2,487,548 | Hawkins | Nov. 8, 1949 |
| 2,710,198 | Hall | June 7, 1955 |

FOREIGN PATENTS

| | | |
|---|---|---|
| 610,151 | Germany | Mar. 9, 1935 |